US 6,608,261 B2

(12) United States Patent
Thadani (10) Patent No.: US 6,608,261 B2
(45) Date of Patent: Aug. 19, 2003

(54) FISHING SCALE WITH RETRACTABLE HANDLE AND BUILT-IN MECHANICAL THERMOMETER

(76) Inventor: Mohan Thadani, 4120 Ridgeway Dr. Apt #37, Mississauga, Ontario L5L 5S9 (CA)

( * ) Notice: Subject to any disclaimer, the term of this patent is extended or adjusted under 35 U.S.C. 154(b) by 0 days.

(21) Appl. No.: 09/884,086

(22) Filed: Jun. 20, 2001

(65) Prior Publication Data

US 2002/0195282 A1 Dec. 26, 2002

(51) Int. Cl.[7] .................... G01G 21/00; G01G 19/56
(52) U.S. Cl. .................. 177/126; 177/148; 177/238
(58) Field of Search ............... 177/148, 149, 177/126, 127, 238, 245

(56) References Cited

U.S. PATENT DOCUMENTS

| | | | | |
|---|---|---|---|---|
| 2,603,474 A | * | 7/1952 | Mandolf et al. | 177/126 |
| 2,750,184 A | * | 6/1956 | Warndahl | 177/127 |
| 4,554,189 A | * | 11/1985 | Marshall | 428/11 |
| 4,660,666 A | * | 4/1987 | Reder et al. | 177/148 |
| 4,927,015 A | * | 5/1990 | Jones | 206/315.9 |
| 4,936,399 A | * | 6/1990 | Christman et al. | 177/149 |
| 5,031,710 A | * | 7/1991 | Parker et al. | 177/210 FP |
| 5,088,223 A | * | 2/1992 | Chu | 43/17 |
| 5,545,855 A | * | 8/1996 | Stanfield et al. | 177/148 |
| 5,560,315 A | * | 10/1996 | Lampe | 119/51.5 |
| 5,637,838 A | * | 6/1997 | Arey et al. | 177/148 |
| 5,830,034 A | * | 11/1998 | Ciechanowski et al. | 446/219 |
| 5,854,447 A | * | 12/1998 | Greenwood et al. | 177/148 |
| 5,922,999 A | * | 7/1999 | Yang | 177/148 |
| 5,986,222 A | * | 11/1999 | Helberg | 177/148 |
| 6,059,676 A | * | 5/2000 | Seymour et al. | 473/570 |
| 6,186,634 B1 | * | 2/2001 | Pitts | 362/84 |
| 6,256,896 B1 | * | 7/2001 | Landauer | 177/245 |
| 6,429,391 B1 | * | 8/2002 | Gruver | 177/148 |

OTHER PUBLICATIONS

A printout (labeled W–1) of a World Wide Web site (Web site) relating to a "Bass Pro Shops Fish Scale", 1 page, printed Apr. 6, 2001.
A printout (labeled W–2) of a Web site relating to a "Normark Weigh–In Scale", 1 page, printed Apr. 6, 2001.
A printout (labeled W–3) of a Web site relating to "Normark Weigh–In Scales", 1 page, printed Apr. 6, 2001.
A printout (labeled W–4) of a Web site relating to a "Stren 50–lb. Digital Scale", 1 page, printed Apr. 6, 2001.
A printout (labeled W–5) of a Web site relating to a "Berkely 20–lb. Digital Fish Scale", 1 page, printed Apr. 6, 2001.
A printout (labeled W–6) of a Web site relating to a "Berkely 50–lb. Digital Fish Scale", 1 page, printed Apr. 6, 2001.

* cited by examiner

Primary Examiner—Randy Gibson
(74) Attorney, Agent, or Firm—Greenblum & Bernstein, P.L.C.

(57) ABSTRACT

An apparatus is provided that includes a support body having a scale, a suspending member that suspends an article to be weighed by the scale, a display unit that displays the measured weight of the article, a retractable and extendable handle, a tape measure, and a temperature probe. The apparatus may be made of luminescent material.

34 Claims, 9 Drawing Sheets

FISHING SCALE WITH RETRACTABLE HANDLE AND BUILT-IN MECHANICAL THERMOMETER

BACKGROUND OF THE INVENTION

1. Field of the Invention

The present invention relates to the field of portable scales, and in particular to a portable fishing scale and improvements thereto.

2. Description of Related Art

There are different types of scales for weighing articles, such as for weighing fish. These scales may be portable so that fish may be weighed immediately or soon after they are caught, while still on site, for example, on a boat or pier.

A scale from BASS PRO SHOPS, of Springfield Miss., is an example of a portable fishing scale for weighing fish. This fishing scale includes a body having a dial gauge for displaying the measured weight, a handle for a user to hold while carrying the scale or weighing an object with the scale, and a hook for holding a fish while weighing. This fishing scale includes a built-in measuring tape for measuring the dimensions of a fish. This scale may be used to weigh the fish, and then the fish may be released.

Also known in the scale art are fishing scales having digital displays. Digital scales have many features, including a precise display which is easy to read. An example of a fishing scale with a digital display is the NORMARK® Weigh-In Scale from The Rapala Normark Group of Minnesota. The NORMARK fishing scale includes a body, a handle for carrying or weighing an object with the scale, a hook for holding a fish while weighing, and a digital display that displays the measured weight. This fishing scale includes a tare weight feature and comes in three different model sizes to weigh objects in different weight ranges, and is available in a model with readings in pounds or in a model with readings in kilograms.

Another example of a digital display fishing scale is the STREN® 50-lb Digital Scale, available from BASS PRO SHOPS, of Springfield Miss. This fishing scale includes a digital display, memory to record the weights measured, and a stabilizing feature to provide accurate measurements even on rough waters. The scale operates on a 9V battery.

The prior art also includes the BERKELY® 20-lb. Digital Fish Scale, available from BASS PRO SHOPS, of Springfield Miss. This fishing scale has a large digital display for easy reading and is accurate for weighing articles up to 20 pounds. This fishing scale is sealed to be water-resistant, and includes an automatic shut off feature and a permanent lithium battery. Another example of a digital fishing scale is the BERKELY® 50-lb. Digital Fish Scale, available from BASS PRO SHOPS, of Springfield Miss. This fishing scale has a handle, a gripping edge, a digital display, and a hook for holding the article being weighed. This scale includes strain gauge weighing technology. The unit is sealed to be waterproof, has a stationary hook, and includes a lithium battery.

A disadvantage of the prior art is the absence of a digital scale including a display that can be converted between different units, such as kilograms and pounds, of weight measure.

Another disadvantage of the prior art is the absence of a digital scale that includes elements that perform different and additional functions, such as measuring water temperature and determining direction. Since, while fishing, space and weight are at a premium, a scale that performs many functions will save space and weight. Also absent from the prior art is a scale that includes a temperature probe to measure the temperature of the water. Also absent from the prior art is a scale that includes a built-in compass. The prior art also does not include a scale having a handle that is adjustable and retractable. An adjustable and retractable handle is easy and convenient to use since the handle on the scale may be adjusted to the size of the user's hand, or to the user's comfort.

Also absent from the prior art is a scale that is easy to use in the dark or in low light conditions. The prior art does not include a scale constructed of material that glows in the dark.

SUMMARY OF THE INVENTION

The present invention is directed to a fishing scale which overcomes the problems existing in the prior art discussed above.

An object of the invention is to provide a scale that is compact, inexpensive and easy to use, yet capable of providing accurate and reliable weight measurements. Another object of the invention is to provide a scale that can be used for weighing fish. Another object of the invention is to provide a scale that includes additional features, including a compass, a tape measure and a temperature probe. Another object of the invention is to provide a scale with a digital readout. Another object of the invention is to provide a scale that glows in the dark.

An aspect of the present invention provides a digital scale including a support body, a suspending member provided on the support body to suspend an article to be weighed, a load cell provided on the support body to detect and measure the weight of an article suspended from the suspending member, a digital display unit provided on the support body to display the weight measurement, and a tape measure provided on the support body, wherein the tape measure is extendable from and retractable into the support body.

According to a further aspect of the present invention, the digital scale may further include a temperature probe, the temperature probe including a graduated scale including indicia denoting units of temperature measurement. The digital scale of the present invention may further include a hinge mounted on the support body, wherein the temperature probe is mounted on the hinge for pivotal movement between open and closed positions.

In a further aspect of the present invention, the support body may include a top surface and an opposing bottom surface and a pair of slots provided in the top surface, the digital scale further including a handle extending from the top surface of the support body, wherein the handle includes an elongated gripping portion having two ends and a leg extending substantially perpendicularly from each end, and wherein the legs are slidable in the slots so that the handle is movable between retracted and extended positions. According to a further aspect of the present invention, the handle may further include gripping protrusions extending therefrom.

According to a further aspect of the present invention, the digital scale may further include a set clock function button to set, start and stop the digital display as a clock, a mode function button to switch the digital display between the display of time and of weight, and a tare function button to perform a tare function to enable weighing of articles in a container.

In a further aspect of the present invention a digital scale is provided including a support body, a suspending member provided on the support body to suspend an article to be weighed, a load cell provided on the support body to detect and measure the weight of an article suspended from the suspending member; a digital display unit provided on the support body to display the weight measurement, and a temperature probe provided on the support body. In the digital scale of the present invention the temperature probe may further include a graduated scale including indicia denoting units of temperature measurement and a hinge mounted on the support body, wherein the temperature probe is mounted on the hinge for pivotal movement between open and closed positions.

In a further aspect of the present invention, an apparatus is provided including a support body, the support body including a top surface and an opposing bottom surface, a suspending member extending from the bottom surface of the support body to suspend an article, a weighing mechanism provided on the support body, wherein the weighing mechanism determines the weight of an article suspended from the suspending member, a display unit to display the weight of an article suspended from the suspending member determined by the weighing mechanism, and a temperature probe provided on the support body.

According to a further aspect of the present invention, the apparatus may further include a compass provided on the support body.

In a further aspect of the present invention, the apparatus may include luminescent material. According to a further aspect of the present invention, the luminescent material may include plastic having luminescent pigment therein. According to a further aspect of the present invention, the luminescent material may include plastic having phosphorescent material therein.

In a still further aspect of the present invention, the apparatus may be waterproof.

BRIEF DESCRIPTION OF THE DRAWINGS

The above and other objects, features and advantages of the present invention will be made apparent from the following description of the preferred embodiments, given as nonlimiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

With reference to FIGS. 1–12 of the drawings, reference numeral 1 denotes the fishing scale of the present invention. The fishing scale 1 includes a support body 2. The support body 2 may have any desired shape. In the present embodiment, the support body 2 is formed to have a generally rectangular shape including left side 3, right side 4, top surface 5, bottom surface 6, front face 7, and rear face 8. While the support body 2 is shown in the present embodiment as having straight side surfaces and curved top and bottom surfaces, the support body 2 may, for example, have all straight surfaces or all curved surfaces, or any combination thereof.

Figure 1:
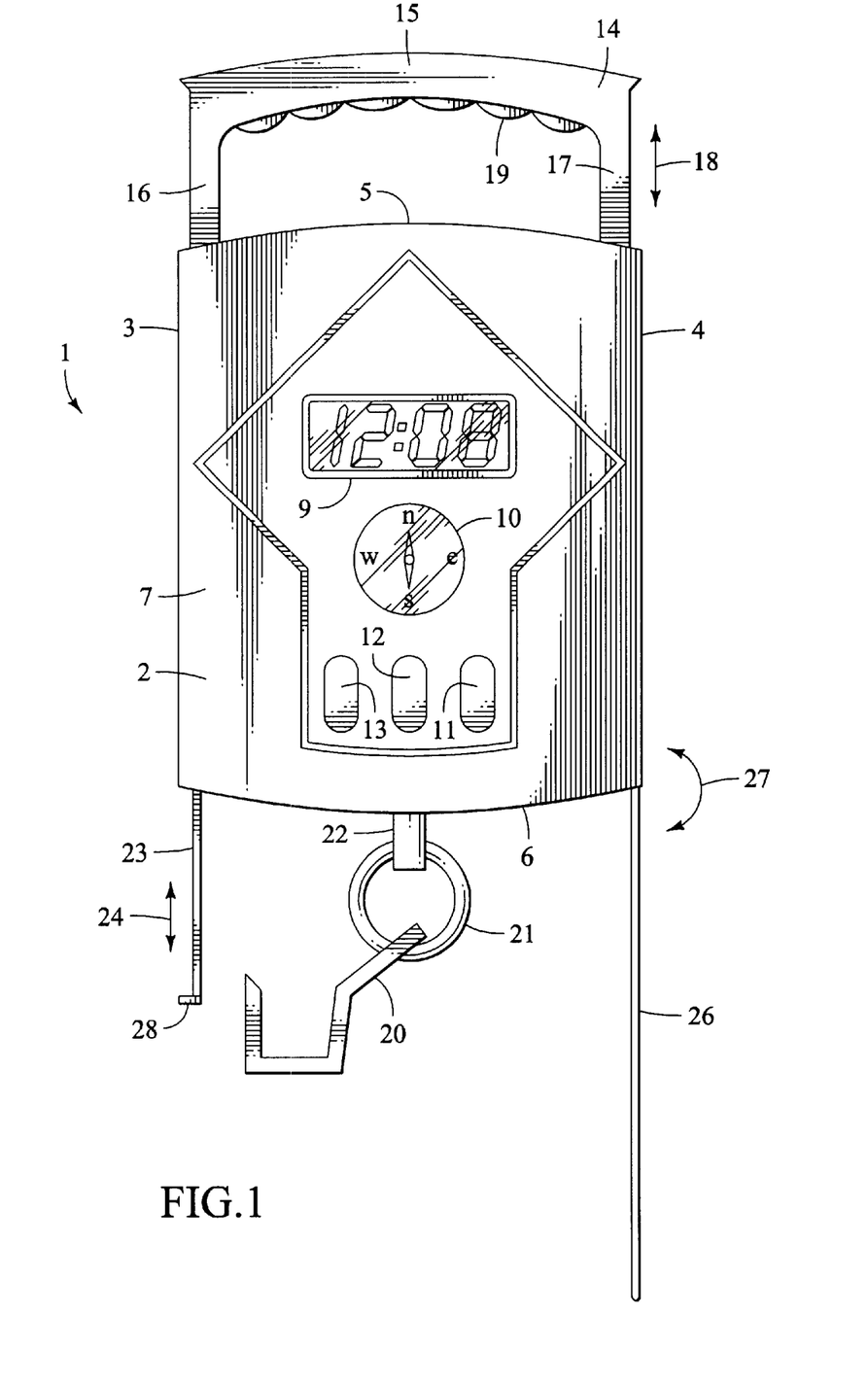
FIG. 1 is a front view of a scale, showing the tape measure and temperature probe in open positions, according to an embodiment of the present invention.
Figure 2:
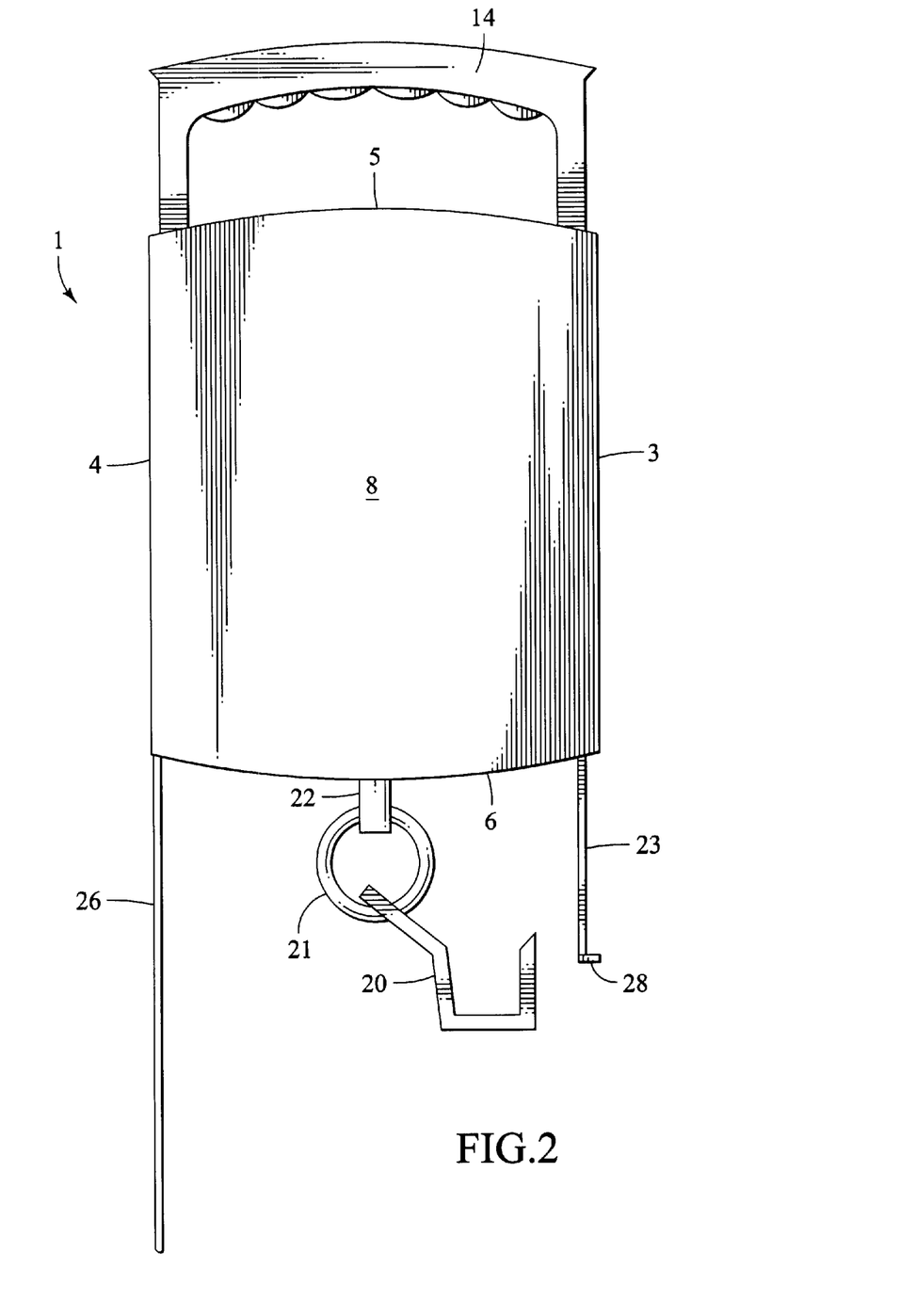
FIG. 2 is a rear view of the scale of FIG. 1.
Figure 3:
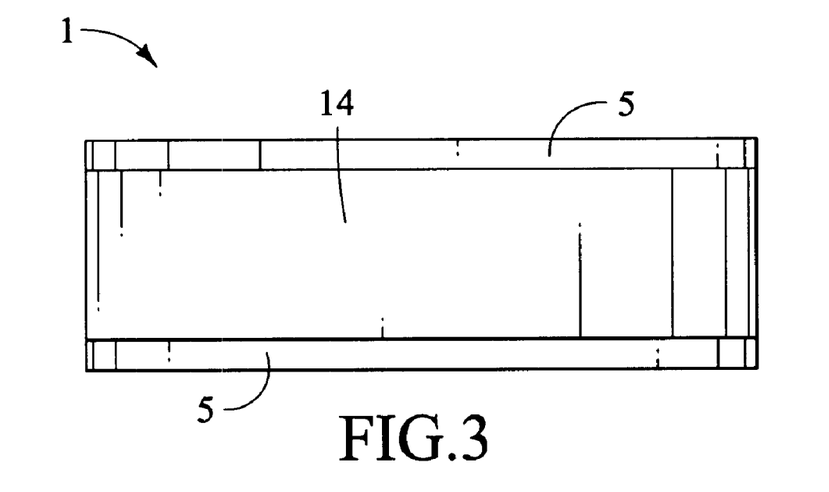
FIG. 3 is a top view of the scale of FIG. 1.

The support body 2 may be constructed of any suitable material, for example, plastic or metal. A display unit, such as a liquid crystal display (LCD) 9, is provided on the support body 2. The LCD 9 may be provided in any suitable location on the support body 2, and in the present embodiment is provided on the front face 7. The support body 2 also includes a compass 10 with a needle and indicia denoting North, South, East and West. The compass 10 may be provided in any suitable location on the support body 2, and in the present embodiment is provided on the front face 7. The support body 2 includes three function buttons 11, 12, and 13. The device may also include circuitry, arranged in any suitable manner known to those skilled in the art to electrically connect the components, such as the LCD, batteries, function buttons, and load cell. The function buttons 11, 12, 13 may be provided, separately or together, in any suitable location on the support body 2, and in the present embodiment are provided on the front face 7. The device may be configured so that pushing any of the function buttons 11, 12, 13 will turn the display on. The function button 11 performs a set clock function. This set clock function may be used to set the time on the LCD 9 for use as a clock. The set clock function may also be used to set the LCD 9 to zero, to start the clock running and to stop the clock running to use the device as a stop watch. The function button 12 performs the mode function. The mode function operates to switch the display unit between desired displayed quantities. For example, the display unit may display the time (the clock or stop watch mode), or the weight of the article being weighed on the scale (the weighing mode). Thus, the function button 12 switches between the display of time or weight. Further, in the weighing mode, different units may be displayed. Thus, for example, in the weighing mode, kilograms or pounds may be displayed. The mode function button 12 may be used to switch between the kilogram and pound display. The function button 13 performs the tare function and provides the capability of accurately weighing articles held by a suspending member, such as hook 20 described below.

The support body 2 may also include an internal hollow cavity. The hollow cavity provides a space to contain the scale components.

In an embodiment of the present invention, the fishing scale 1 is a load cell transducer scale. In this type of scale, force (i.e., the weight of the article) is converted to an electrical signal. The load cell transducer scale includes a strain element, a strain gage mounted on the strain element, electronic circuitry, and a battery (none of which is shown in the drawings). Any suitable load cell transducer known to those skilled in the art may be utilized. The strain gage may be provided directly on the support body 2, so that the support body 2 serves as the strain element. Alternatively, the device may include a strain element and a strain gage thereon provided in the cavity of the support body 2. In a condition of no strain (when the scale is empty), there is zero output voltage in the load cell circuitry. When an article is placed on the load cell transducer scale, the surface of the strain element is strained due to the force exerted by the weight of the article. In turn, the strain on the strain element stretches or compresses the wires in the load cell circuit in an amount proportional to the force exerted by the weight of the article. This proportional stretching or compressing causes an imbalance in the load cell circuit, which, in turn, produces a proportional output voltage. The output voltage is converted to a weight measurement by conventional electrical and electronic components, and the weight of the article is displayed on the LCD 9.

The fishing scale 1 may also operate in a manner similar to a seismometer. A strain seismometer, or strainmeter, measures the movement, at low frequencies, of one point of the ground relative to another during an earthquake. Similarly, the components of the fishing scale 1 measure the movement of one point on the strain element relative to another point on the strain element during the weighing of an article. Again, any suitable strain seismometer known to those skilled in the art may be utilized.

The fishing scale 1 of the present invention may also include a handle 14. The handle 14 may be used for carrying the fishing scale 1 in one's hand, or for hanging the fishing scale 1, such as by a hook, for storage. The handle 14 may also be used for holding the fishing scale 1 in one's hand while weighing an article. In the present embodiment, the handle 14 is provided on the top surface 5. The handle 14 includes a gripping portion 15 and legs 16, 17 extending from the gripping portion 15. The legs 16, 17 are slidable in slots formed in the top surface 5 of the support body 2, as shown by the arrow 18 in FIG. 1. Sliding the legs 16, 17 inwardly in the slots moves the gripping portion 15 closer to the top surface 5. Such a close position of the gripping portion 15 provides a smaller overall dimension to the fishing scale 1. An inward position may be used for storage of the fishing scale 1, or for use by a person having a smaller hand. Sliding the legs 16, 17 outwardly in the slots moves the gripping portion 15 farther away from the top surface 5, and leaves a larger space between the gripping portion 15 and the top surface 5. Such an outward position may be used by a person having a larger hand. The gripping portion 15 of the handle 14 may also include protrusions 19. The protrusions 19 are provided to increase the friction of the surface of the handle, to prevent dropping the fishing scale 1 in slippery and wet conditions. The protrusions 19 may be any desired shape, and in the present embodiment, are configured as half-circular in shape. The legs 16, 17 include end stops (not shown) to prevent unintended removal of the legs 16, 17 from the slots. Additionally, intermediate stops may be provided on each leg 16, 17 to provide intermediate positions of the handle 14.

Figure 4:
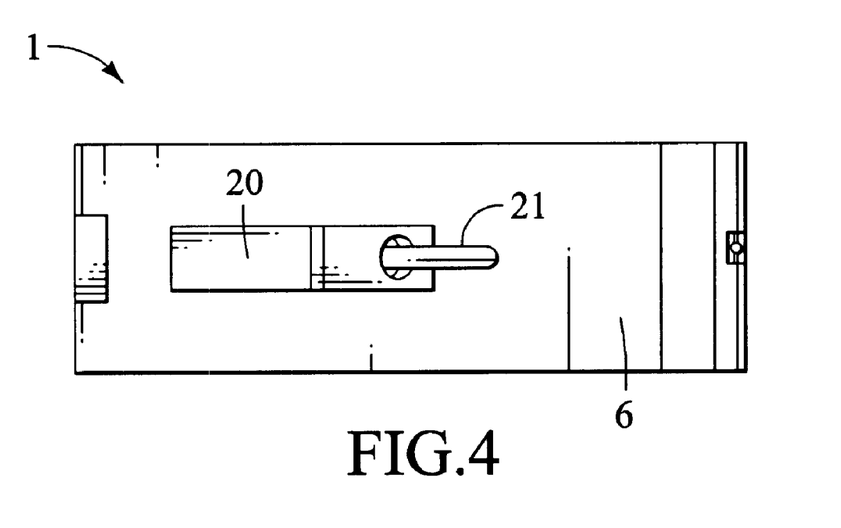
FIG. 4 is a bottom view of the scale of FIG. 1.
Figure 5:
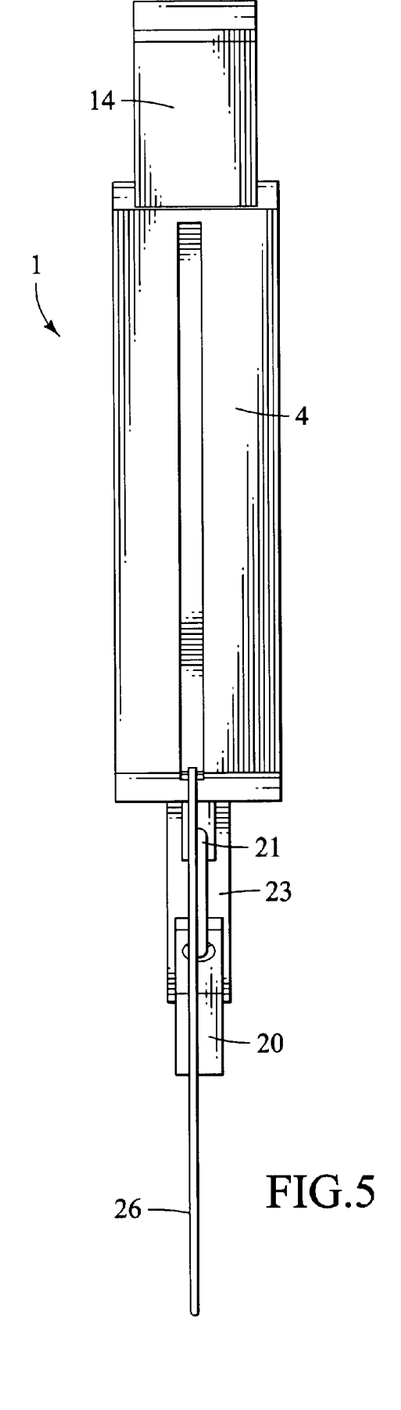
FIG. 5 is a right side view of the scale of FIG. 1.

The fishing scale 1 of the present invention further includes a suspending member, such as a hook 20. An article to be weighed is suspended by the suspending member. The hook 20 may swing freely on a ring 21. As shown in FIGS. 4 and 5, the ring 21 may be mounted, by a suitable fastener, such as a slotted element 22, on the bottom surface 6 of the support body 2. In use, an article to be weighed, such as a fish, is hung on the hook 20.

Figure 6:
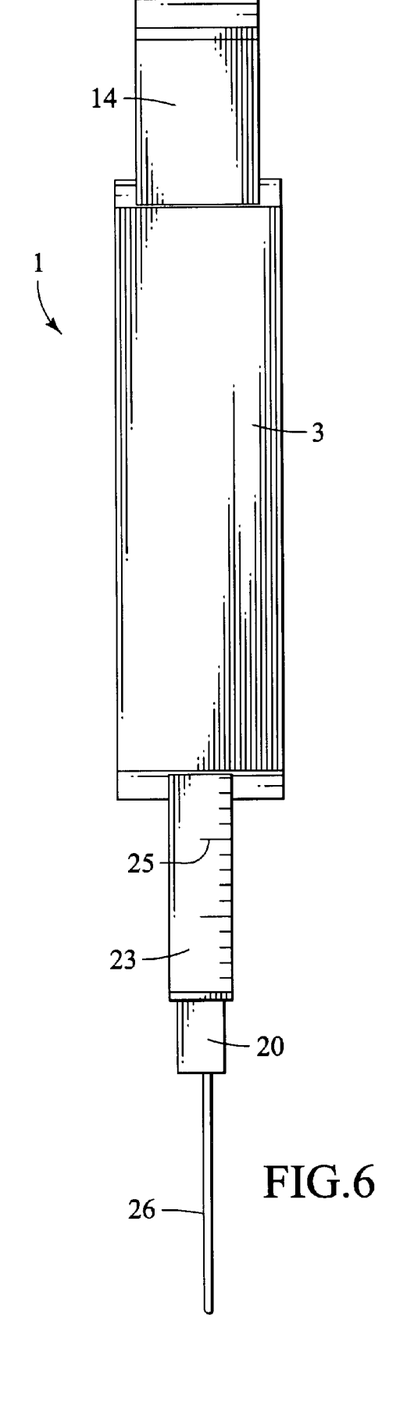
FIG. 6 is a left side view of the scale of FIG. 1.
Figure 7:
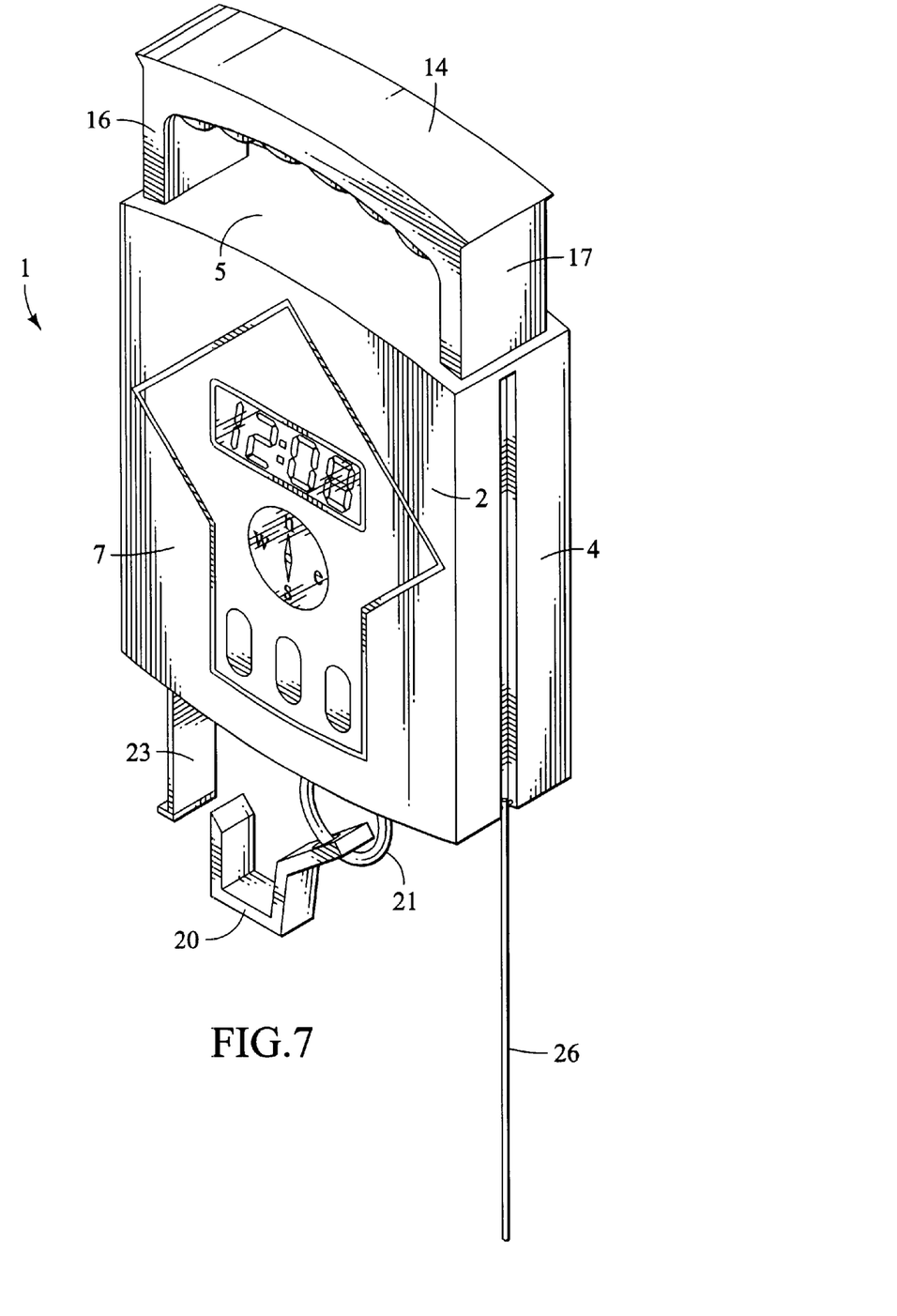
FIG. 7 is a perspective view of the scale of FIG. 1.
Figure 8:
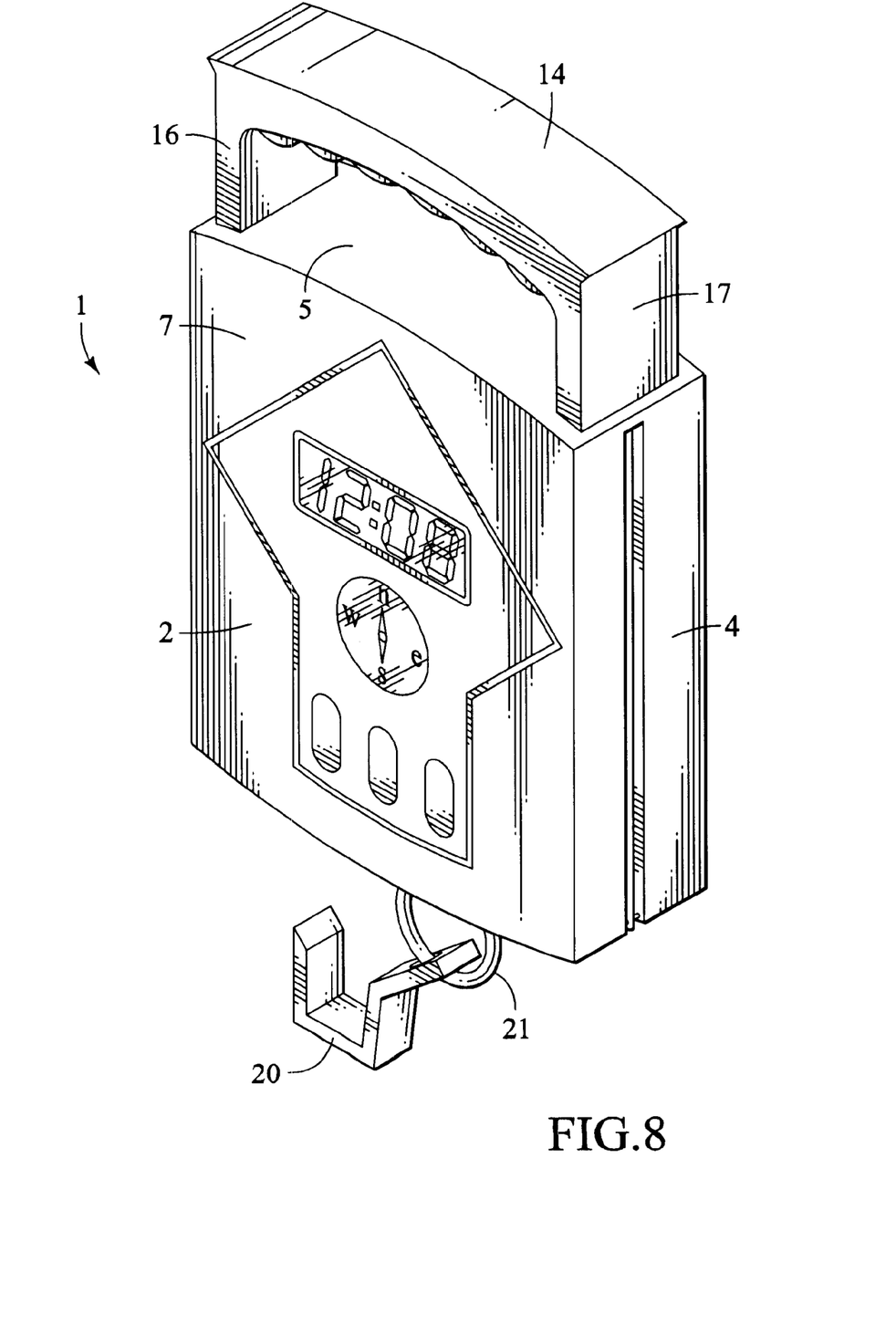
FIG. 8 is a perspective view of the scale of FIG. 1, showing the tape measure and temperature probe in closed positions.
Figure 9:
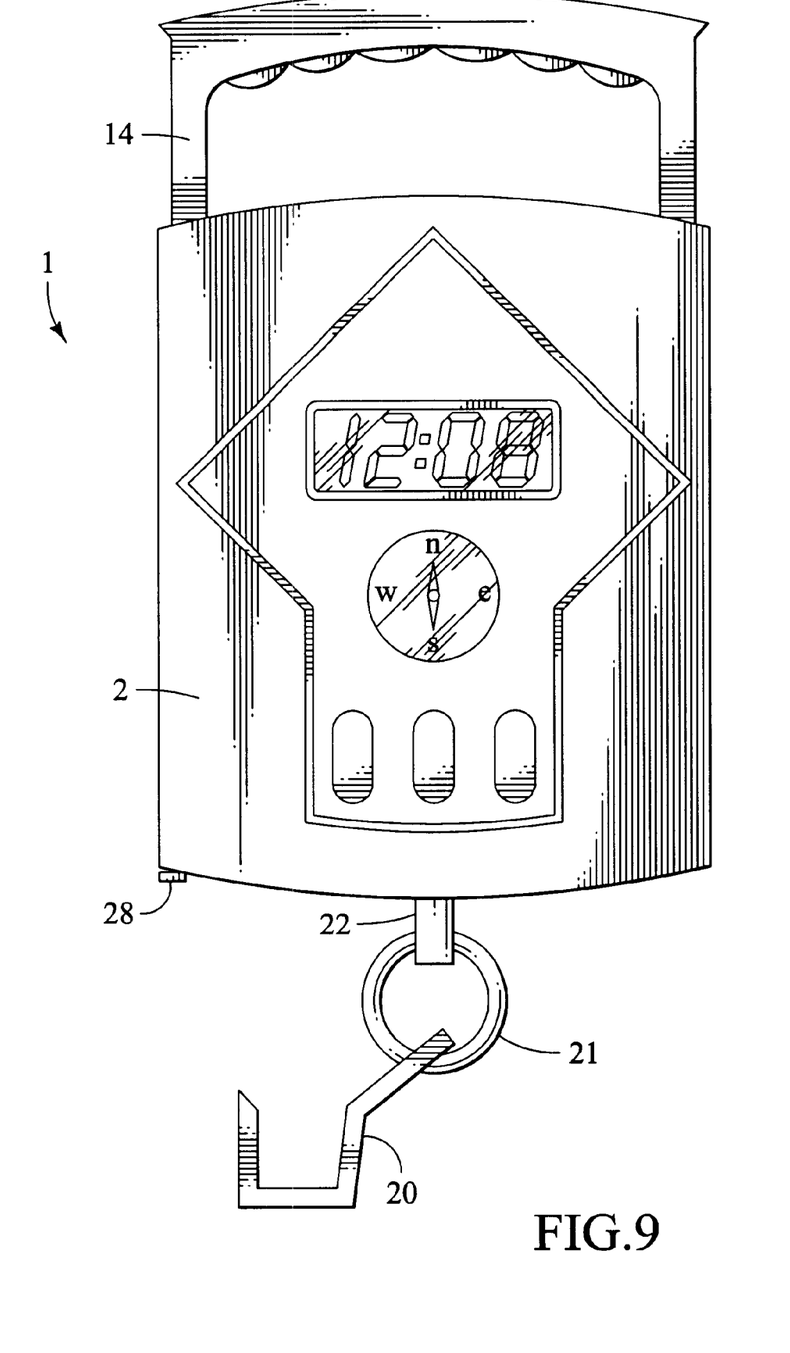
FIG. 9 is a front view of the scale of FIG. 1, showing the tape measure and temperature probe in closed positions.
Figure 10:
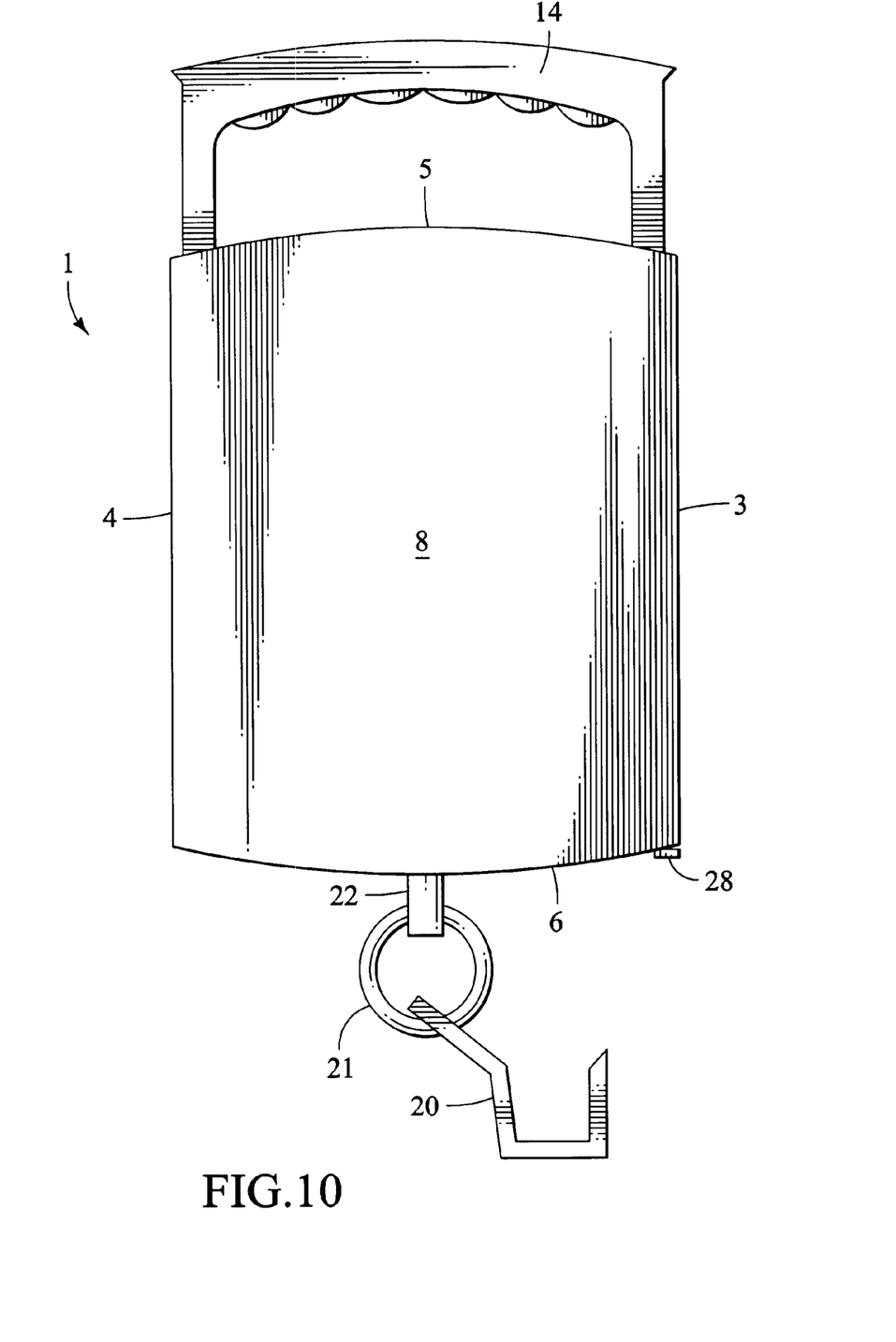
FIG. 10 is a rear view of the scale of FIG. 1 showing the tape measure and temperature probe in closed positions.
Figure 11:
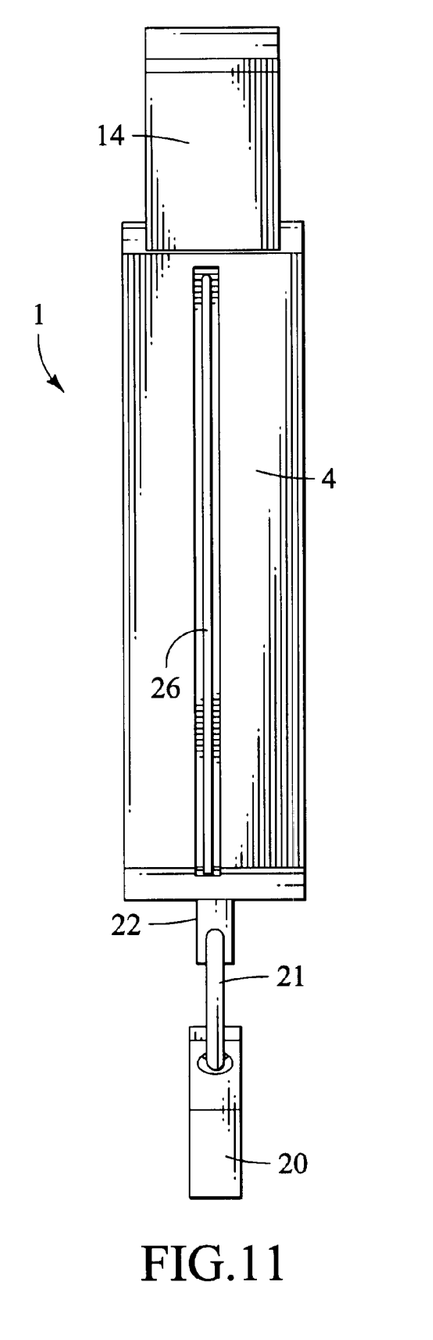
FIG. 11 is a right side view of the scale of FIG. 1, showing the tape measure and temperature probe in closed positions.
Figure 12:
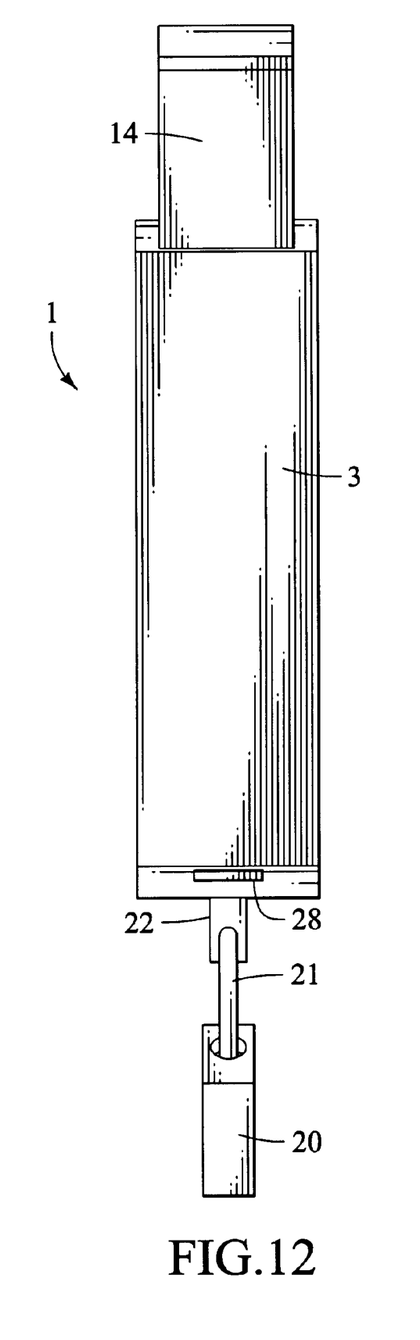
FIG. 12 is left side view of the scale of FIG. 1, showing the tape measure and temperature probe in closed positions.

The fishing scale 1 of the present invention may further include a tape measure 23. The tape measure 23 has an elongated shape with a substantially perpendicular extension 28. The tape measure 23 may be formed in any suitable manner and is slidable in a slot in the bottom surface 6 of the support body 2, as shown by the arrow 24. The extension 28 may be used for grasping while sliding the tape measure 23 in the slot; the extension 28 may also be used as a stop plate for the article being measured. As shown in FIG. 6, the tape measure 23 includes a graduated scale 25 on an outer surface for measuring length. The graduated scale 25 may be marked in any convenient units, such as in inches or centimeters, or may include a plurality of scales in different units. Sliding the tape measure 23 inwardly through the slot moves the tape measure 23 to a closed position for storage. The tape measure 23 may include a spool and a spring mechanism inside the cavity of the support body 2, so that the tape measure will slide through the slot and roll onto the spool by the force of the spring mechanism to the closed position. Sliding the tape measure 23 outwardly through the slot moves the tape measure 23 to an open position exposing the graduated scale, for use of the tape measure 23.

The fishing scale 1 of the present invention may further include a temperature probe 26. The temperature probe 26 may be of the thermometer type and include a graduated scale in temperature units, such as Fahrenheit or Celsius, or both. The temperature probe 26 is pivotable about a hinge, as shown by arrow 27. The temperature probe 26 is pivotable between a closed position, in which the temperature probe 27 is positioned adjacent the right side 4 of the support body 2, and an open position, in which the temperature probe 27 extends from the bottom 6 along the right side 4 of the support body 2. The temperature probe 26 may be used for finding the temperature of fishing waters.

Another aspect of the present invention may include a portable fishing scale that is waterproof. The fishing scale may be constructed of any nonporous, waterproof material, such as, for example, plastic or metal. The fishing scale may also include waterproof seals at all of the connection points of the parts of the scale. The fishing scale may further include a waterproof covering to completely or partially encase the fishing scale.

Another aspect of the present invention may include a portable fishing scale that is luminescent, such as, for example, phosphorescent. The portable fishing scale may include components constructed of any suitable synthetic or natural plastic material. Phosphorescent pigments may be incorporated into the plastic material of the scale so that the entire scale glows in the dark. Additionally, phosphorescent pigments may be incorporated into the plastic material of the components of the scale. The user may then easily retrieve and/or use the portable fishing scale in a dark or near dark environment, such as for example, fishing during twilight or at nighttime. Such components are not limited to any particular type of portable scale, and may be incorporated into any known portable scale, such as, for example, a balance beam scale, a spring scale, a load cell, or a digital scale.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A digital scale comprising:
    a support body;
    a suspending member provided on said support body to suspend an article to be weighed;
    a load cell provided on said support body to detect and measure the weight of an article suspended from said suspending member;
    a digital display unit provided on said support body to display said weight measurement; and
    a tape measure provided on said support body, wherein said tape measure is extendable from and retractable into said support body;
    wherein said support body includes a top surface and an opposing bottom surface and a pair of slots provided in said top surface, said digital scale further comprising a handle extending from said top surface of said support body, said handle comprising an elongated gripping portion having two ends and a leg extending substantially perpendicularly from each said end, and wherein said legs are slidable in said slots so that said handle is movable between retracted and extended positions.

2. A digital scale comprising:
    a support body;
    a suspending member provided on said support body to suspend an article to be weighed;
    a load cell provided on said support body to detect and measure the weight of an article suspended from said suspending member;
    a digital display unit provided on said support body to display said weight measurement;
    a tape measure provided on said support body, wherein said tape measure is extendable from and retractable into said support body; and
    a temperature probe, said temperature probe including a graduated scale including indicia denoting units of temperature measurement;
    wherein said temperature probe is hingedly mounted on said support body for pivotal movement between open and closed positions.

3. The digital scale according to claim 1, further comprising a set clock function button to set, start and stop said digital display as a clock.

4. The digital scale according to claim 3, further comprising a mode function button to switch said digital display between the display of time and of weight.

5. The digital scale according to claim 4, further comprising a tare function button to perform a tare function to enable weighing of articles in a container.

6. A digital scale comprising:
    a support body;
    a suspending member provided on said support body to suspend an article to be weighed;
    a load cell provided on said support body to detect and measure the weight of an article suspended from said suspending member;
    a digital display unit provided on said support body to display said weight measurement; and
    a temperature probe provided on said support body;
    wherein said support body includes a top surface and an opposing bottom surface and a pair of slots provided in said top surface, said digital scale further comprising a handle extending from said top surface of said support body, said handle comprising an elongated gripping portion having two ends and a leg extending substantially perpendicularly from each said end, and wherein said legs are slidable in said slots so that said handle is movable between retracted and extended positions.

7. The digital scale according to claim 6, wherein said temperature probe includes a graduated scale including indicia denoting units of temperature measurement.

8. The digital scale according to claim 6, wherein said temperature probe is hingedly mounted on said support body for pivotal movement between open and closed positions.

9. The digital scale according to claim 6, further comprising a set clock function button to set, start and stop said digital display as a clock.

10. The digital scale according to claim 9, further comprising a mode function button to switch said digital display between the display of time and of weight.

11. The digital scale according to claim 10, further comprising a tare function button to perform a tare function to enable weighing of articles in a container.

12. An apparatus comprising;
    a support body, said support body including a top surface and an opposing bottom surface;
    a suspending member extending from said bottom surface of said support body to suspend an article;
    a weighing mechanism provided on said support body, wherein said weighing mechanism determines the weight of an article suspended from said suspending member;
    a display unit to display said weight of an article suspended from said suspending member determined by said weighing mechanism;
    a temperature probe provided on said support body;
    a pair of slots provided in said top surface of said support body; and
    a handle extending from said top surface of said support body, wherein said handle comprises an elongated gripping portion having two ends and a leg extending substantially perpendicularly from each said end, and wherein said legs are slidable in said slots so that said handle is movable between retracted and extended positions.

13. The apparatus according to claim 12, wherein said temperature probe is hingedly mounted on said support body for pivotal movement between open and closed positions.

14. The apparatus according to claim 12, further comprising a compass provided on said support body.

15. The apparatus according to claim 12, wherein said handle further comprises gripping protrusions extending therefrom.

16. The apparatus according to claim 13, wherein said weighing mechanism
    a load cell to detect and measure the weight of an article suspended from said suspending member; and
    a digital display unit provided on said support body to display said weight measurement.

17. The apparatus according to claim 12, wherein said apparatus includes luminescent material.

18. The apparatus according to claim 17, wherein said luminescent material comprises plastic having luminescent pigment therein.

19. The apparatus according to claim 17, wherein said luminescent material comprises plastic having phosphorescent material therein.

20. The apparatus according to claim 12, wherein said apparatus is waterproof.

21. The apparatus according to claim 12, further comprising a tape measure extendable from and retractable into said support member.

22. The apparatus according to claim 12, wherein said temperature probe includes a graduated scale including indicia denoting units of temperature measurement.

23. The apparatus according to claim 16, further comprising a set clock function button to set, start and stop said digital display as a clock.

24. The apparatus according to claim 23, further comprising a mode function button to switch said digital display between the display of time and of weight.

25. The apparatus according to claim 24, further comprising a tare function button to perform a tare function to enable weighing of articles in a container.

26. The digital scale according to claim 1, wherein said scale includes luminescent material.

27. The digital scale according to claim 26, wherein said luminescent material comprises plastic having luminescent pigment therein.

28. The digital scale according to claim 26, wherein said luminescent material comprises plastic having phosphorescent material therein.

29. The digital scale according to claim 6, wherein said scale includes luminescent material.

30. The digital scale according to claim 29, wherein said luminescent material comprises plastic having luminescent pigment therein.

31. The digital scale according to claim 29, wherein said luminescent material comprises plastic having phosphorescent material therein.

32. The digital scale according to claim 5, farther including circuitry that electrically connects said load cell, said digital display unit and said function buttons.

33. The digital scale according to claim 11, further including circuitry that electrically connects said load cell, said digital display unit and said function buttons.

34. The apparatus according to claim 25, further including circuitry that electrically connects said load cell, said digital display unit and said function buttons.

* * * * *

UNITED STATES PATENT AND TRADEMARK OFFICE
CERTIFICATE OF CORRECTION

PATENT NO.    : 6,608,261 B2
DATED         : August 19, 2003
INVENTOR(S)   : M. Thadani

It is certified that error appears in the above-identified patent and that said Letters Patent is hereby corrected as shown below:

Column 8,
Line 58, after "mechanism" insert -- comprises --.

Column 10,
Line 12, "farther" should be -- further --.

Signed and Sealed this

Eighth Day of June, 2004

JON W. DUDAS
*Acting Director of the United States Patent and Trademark Office*